(12) United States Patent
Wilson (10) Patent No.: US 9,726,263 B1
(45) Date of Patent: *Aug. 8, 2017

(54) VARIABLE TRANSMISSION SYSTEM

(71) Applicant: X Development LLC, Mountain View, CA (US)

(72) Inventor: Robert Wilson, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/155,636

(22) Filed: May 16, 2016

Related U.S. Application Data (63) Continuation of application No. 14/288,432, filed on May 28, 2014, now Pat. No. 9,366,323.

(51) Int. Cl.
*F16H 19/00* (2006.01)
*F16H 9/04* (2006.01)
*F16H 9/24* (2006.01)

(52) U.S. Cl.
CPC .............. *F16H 9/04* (2013.01); *F16H 9/24* (2013.01)

(58) Field of Classification Search
None
See application file for complete search history.

(56) References Cited

U.S. PATENT DOCUMENTS

| | | | | |
|---|---|---|---|---|
| 3,412,623 | A * | 11/1968 | Gritt | F16D 13/52 192/48.9 |
| 3,731,549 | A * | 5/1973 | Kaiser | D06H 7/02 474/18 |
| 3,948,114 | A * | 4/1976 | Koinzan | F16G 13/06 474/101 |
| 9,366,323 | B1 * | 6/2016 | Wilson | F16H 19/0622 |
| 2003/0127635 | A1 * | 7/2003 | Morse | B66D 3/18 254/268 |
| 2007/0155558 | A1 * | 7/2007 | Horst | F16H 19/06 474/133 |
| 2014/0135988 | A1 * | 5/2014 | Yanagihara | B25J 13/04 700/258 |

* cited by examiner

*Primary Examiner* — Edwin A Young
(74) *Attorney, Agent, or Firm* — McDonnell Boehnen Hulbert & Berghoff LLP (57) ABSTRACT

An example variable transmission system is provided. As an example, a variable transmission system may include a frame, an output hub coupled to the frame, a first linear actuator coupled to the frame, and a second linear actuator coupled to the frame. The variable transmission system may also include a tension-bearing element positioned around the output hub. A first end of the tension-bearing element may be coupled to the first linear actuator, and a second end of the tension-bearing element may be coupled to the second linear actuator. The tension-bearing element may include a variable stiffness profile such that a transmission ratio of the output hub may be adjusted based on a position of the second linear actuator relative to the output hub.

20 Claims, 7 Drawing Sheets

VARIABLE TRANSMISSION SYSTEM

CROSS-REFERENCE TO RELATED APPLICATIONS

This application is a continuation of U.S. patent application Ser. No. 14/288,432 filed May 28, 2014, the contents of which are hereby incorporated by reference.

BACKGROUND

Unless otherwise indicated herein, the materials described in this section are not prior art to the claims in this application and are not admitted to be prior art by inclusion in this section.

Electric motor actuators for robotic and automation systems often require a transmission (speed reducer) in order to operate within the speed-torque requirements of a specific application and of the motor. Commonly used systems include multi-stage gearboxes, timing belts, cable drive, harmonic drives, and cycloid gearboxes. These systems are often too inefficient, susceptible to overload damage, heavy, and require expensive precision manufacturing. Such systems are also often too expensive for consumer products when high performance is required.

As an example, harmonic drive systems can be used in high performance applications where low backlash and gear-ratios greater than 50:1 are required. The harmonic drive is proprietary, heavy, inefficient, and expensive for consumer application. As another example, cable drive systems can be lightweight and efficient; however, achieving useful transmission ratios may lead to complex multi-stage designs that require high preload forces, large cable bend radii, and challenging cable management. Often it is desired to integrate a torque sensor such as a strain gauge load cell at or near the output of the transmission in order to achieve closed loop torque control. Practically, such as a case on a rotating output hub, integration of this sensor can prove challenging as the sensor wires typically rotate with the transmission output, and therefore, requires cable management, adding complexity and increasing the number of failure points.

SUMMARY

In one example, a variable transmission system is provided. The variable transmission system may include a frame, an output hub coupled to the frame, a first linear actuator coupled to the frame, and a second linear actuator coupled to the frame. The variable transmission system may also include a tension-bearing element positioned around the output hub. A first end of the tension-bearing element may be coupled to the first linear actuator, and a second end of the tension-bearing element may be coupled to the second linear actuator. The tension-bearing element may include a variable stiffness profile such that a transmission ratio of the output hub may be adjusted based on a position of the second linear actuator relative to the output hub.

In another example, another variable transmission system is provided. The variable transmission system may include a frame, an output hub rotatably coupled to the frame, an input hub rotatably coupled to the frame, and a linear actuator coupled to the frame. The variable transmission system may also include a tension-bearing element positioned around the output hub. A first end of the tension-bearing element may be positioned around the input hub, and a second end of the tension-bearing element may be coupled to the linear actuator. The tension-bearing element may include a variable stiffness profile such that a transmission ratio of the output hub may be adjusted based on a position of the linear actuator relative to the output hub.

In another example, a method is provided. The method may include determining a load on an output hub of a variable transmission system. The method may also include determining a position of a first end of a tension-bearing element relative to the output hub, where the tension-bearing element is positioned around the output hub. The method may also include determining a position of a second end of the tension-bearing element relative to the output hub. The method may also include adjusting the position of the second end of the tension-bearing element, based on the position of the first end of the tension-bearing element, to achieve a desired transmission ratio of the output hub for the determined load, wherein the transmission ratio of the output hub is proportional to a distance between the second end of the tension-bearing element and the output hub.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIGS. 4A-4D illustrate an example output hub and tension-bearing element.

FIG. 3B illustrates a side view of the example output hub and tension-bearing element, FIG. 3C illustrates a top perspective view of the example output hub and tension-bearing element, and FIG. 3D illustrates a bottom perspective view of the example output hub and tension-bearing element.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Electric motors to rotate drive pulleys may be efficient when operating at high speed and low torque. However, in a specific application of robotic actuators, typically high torques and low speeds are desired. Thus, robotic actuators may require a transmission with a non-trivial gear reduction to reduce a speed of the motor and increase a torque output.

Such transmission technologies exist, including a spur gearbox, planetary gearbox, lead or ball screw, and Harmonic Drive gearheads. Such transmissions, however, may have low efficiency, high cost, high weight, backlash, low gear ratios, and/or low impact and load capacity. These example characteristics may make such transmissions undesired for robotic actuators that require high performance servo control in a lightweight, low-cost mechanism such as a robot manipulator. Many applications may benefit from a variable transmission ratio, such as robotic components, variable-gain sensors, variable resolution read heads, among other applications.

Within examples, methods, devices, and variable transmission systems are described for obtaining output motion of an output hub (e.g., such as robot joint) given an input. In some examples, a compliant tension-bearing element (e.g., belt, chain, cable, etc.) passes from the input over or around the output hub to an endpoint. The endpoint may be an adjustable set point. Driving the input via an actuator results in a deflection of the compliant tension-bearing element relative to its fixed endpoint and results in rotary motion at the output hub. This motion can then be applied to an output load in a rotary or linear motion. Further, the output hub as described herein may be a rotary hub, or the output hub may be fully linear. A gear ratio of the transmission can be adjusted continuously by moving the endpoint relative to the output hub.

Figure 1:
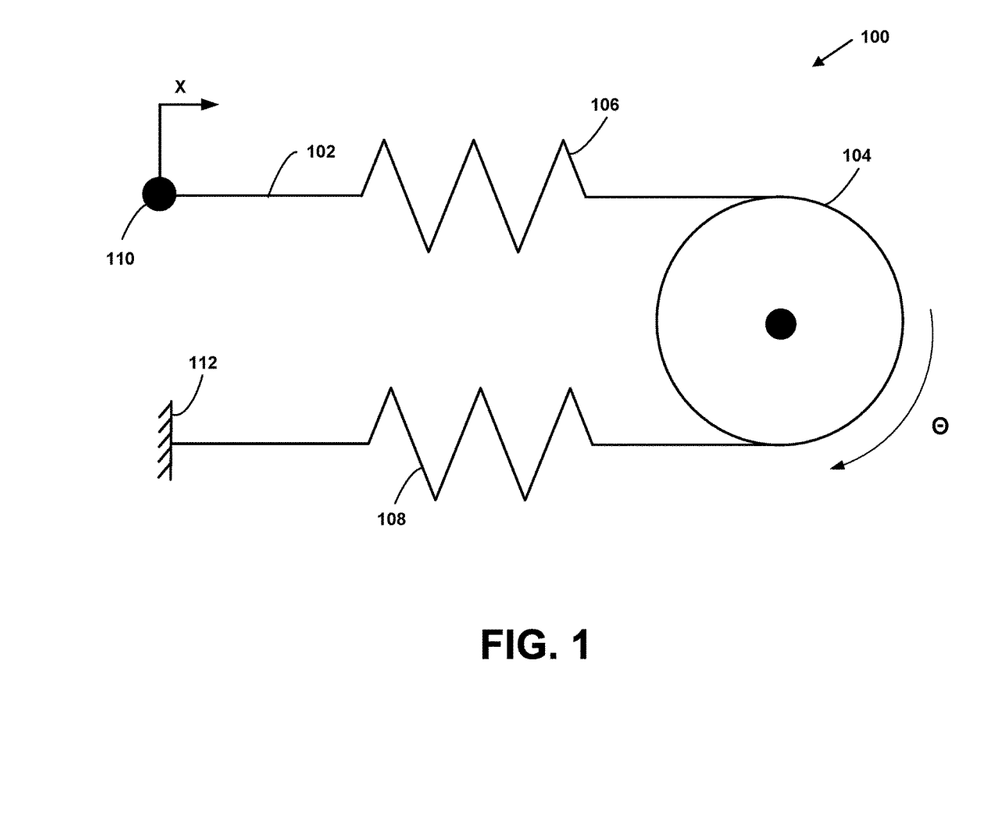
FIG. 1 illustrates a simplified diagram of a transmission system, according to an example embodiment.

Referring now to the figures, FIG. 1 illustrates a simplified diagram of an example transmission system 100. The transmission system 100 includes a tension-bearing element 102 positioned around an output hub 104. The tension-bearing element 102 includes a first portion having a first spring 106 with a first spring constant $k_1$ and a second spring 108 having a second spring constant $k_2$. As shown in FIG. 1, a first end 110 of the tension-bearing element 102 may be an adjustable set point. In one example, the first end 110 may be coupled to a linear actuator configured to move the first end 110 closer to or further away from the output hub 104. In another example, the first end 110 may be coupled to an input hub, such that a rotation of the input hub causes the first end 110 to spool around the input hub. A second end 112 of the tension-bearing element may be fixed, as shown in FIG. 1.

The first spring 106 and the second spring 108 may be replaced by a variety of materials used to vary the stiffness of the tension-bearing element. For example, the transmission system 100 may include an adjustable stiffness pneumatic spring, a material with stiffness that is adjustable via electric current or magnetic field, or a spring that is mechanically reconfigurable to vary stiffness via an integrated actuator. Other examples are possible as well.

In such a configuration, as the first end 110 of the tension-bearing element 102 moves a distance x, the output hub has a corresponding angle of rotation Θ in the direction shown in FIG. 1. Similarly, as the first end 110 of the tension-bearing element 102 moves in the opposite direction, the output hub has a corresponding angle of rotation Θ in the opposite direction. The transmission ratio of the transmission system 100 can be determined by the calculation of Θ divided by x (Θ/x). The transmission ratio of the transmission system 100 represents how much linear movement at the first end 110 is needed for a corresponding angle of rotation Θ at the output hub 104. A high transmission ratio means that a small linear movement at the first end 110 results in a relatively large angle of rotation Θ at the output hub 104. Conversely, a low transmission ratio means that to accomplish the same relatively large angle of rotation Θ at the output hub 104, a much greater linear movement at the first end 100.

Further, the transmission ratio Θ/x is proportional to the ratio of the spring constants of the first spring 106 and the second spring 108. In other words, Θ/x is proportional to $k_1/(k_1+k_2)$. Therefore, by adjusting $k_1/(k_1+k_2)$, the transmission ration Θ/x may also be adjusted. For example, the first spring 106 may be much stiffer than the second spring 108. In such a scenario, $k_1/(k_1+k_2)$ is high, meaning Θ/x is also high. Therefore, a small linear movement at the first end 110 results in a relatively large angle of rotation Θ at the output hub 104. Alternatively, the second spring 108 may be much stiffer than the first spring 106. In such a scenario, $k_1/(k_1+k_2)$ is low, meaning Θ/x is also low. Therefore, a small linear movement at the first end 110 results in a small angle of rotation Θ at the output hub 104.

Figure 2:
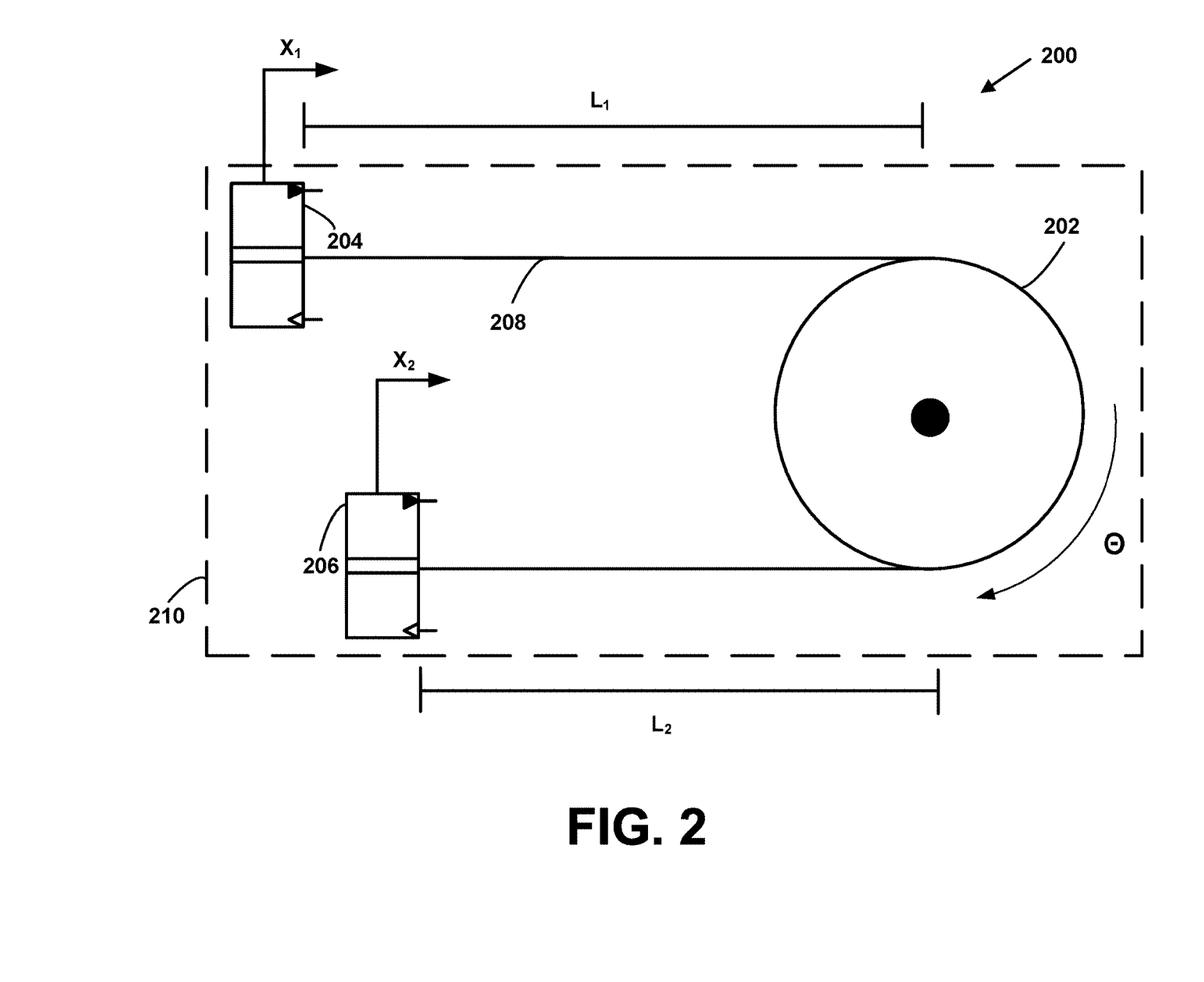
FIG. 2 illustrates a simplified diagram of a variable transmission system, according to an example embodiment.

In various applications, it may be advantageous to change the ratio of the spring constants $k_1/k_2$ to enable a continuous change of the transmission ratio Θ/x. FIG. 2 illustrates a simplified diagram of a variable transmission system 200, according to an example embodiment. The variable transmission system 200 may include an output hub 202, a first linear actuator 204 and a second linear actuator 206. The variable transmission system 200 may further include a tension-bearing element 208 positioned around the output hub 202. A first end of the tension-bearing element 208 is coupled to the first linear actuator 204, and a second end of the tension-bearing element 208 is coupled to the second linear actuator 206. In one example, the variable transmission system 200 may include a frame 210. In such an embodiment, the output hub 202, the first linear actuator 204, and the second linear actuator 206 may be coupled to the frame 210. In particular, the output hub 202 may be rotatably coupled to the frame 210 so as to allow rotation of the output hub 202 relative to the frame 210. The output hub 202 may be coupled to the frame 210 via a pin, or some other means to allow free rotation. The frame 210 may be any type of housing and may be configured as an endoskeleton structure in which the output hub 202 is mounted on an exterior of the frame 210, or as an exoskeleton in which the output hub 202 is mounted within a clamshell type structure.

The tension-bearing element 208 may be any of a belt, a toothed belt, a cable, a string or other material as needed for an application of the output hub 202. In one example, the tension-bearing element 208 may include a toothed belt in series with a spring in series with a cable terminated at the first linear actuator 204. Other examples are possible as well. A load capacity of the output hub 202 may be limited only to the strength of the tension-bearing element 208, and thus, a material for the tension-bearing element 208 can be selected appropriately.

Further, within other examples, the tension-bearing element 208 may be compliant and stretch under load. For example, the tension-bearing element 208 may comprise an elastic material, such as natural or synthetic rubber, or other elastomer materials. As such, the tension-bearing element 208 may include a variable stiffness profile. The variable stiffness profile of the tension-bearing element 208 is evident in that the stiffness of the tension-bearing element 208 may change with a deflection. For example, if the compliant tension-bearing element 208 is stretched, its stiffness increases. Alternatively, if the compliant tension-bearing element 208 is less stretched, its stiffness decreases. The tension-bearing element 208 may be configured with continuous tension, such that the tension-bearing element 208 is taught regardless of the positions of the first and second actuators.

In the configuration shown in FIG. 2, a first end of the tension-bearing element 208 is coupled to the first linear actuator 204, and a second end of the tension-bearing element 208 is coupled to the second linear actuator 206. The first and second linear actuators may be electro-mechanical actuators, including an electric motor configured to convert a rotary motion of the electric motor to a linear displacement of the first or second actuator relative to the output hub 202. The linear displacement may be in the x-direction shown in FIG. 2. Other potential linear actuators are possible as well, such as hydraulic actuators, pneumatic actuators, piezoelectric actuators, linear motors, or telescoping linear actuators, as examples.

Regardless of its form, the first linear actuator 204 may be configured to move the first end of the tension-bearing element 208 to a position further away from the output hub 202 so as to rotate the output hub 202 in a first direction. The tension-bearing element 208 may be positioned around the output hub 202 with constant tension, such that the linear movement of the first linear actuator 204 causes the output hub 202 to rotate. Further, the first linear actuator 204 may be configured to move the first end of the tension-bearing element 208 to a position closer to the output hub 202 so as to rotate the output hub 202 in a second direction. As such, the first linear actuator 206 may be a driving actuator, in that the first linear actuator 204 drives the rotation of the output hub 202.

The second linear actuator 206 may be configured to move the second end of the tension-bearing element 208 to a position further away from the output hub 202 so as to stretch the complaint tension-bearing element 208, thereby increasing the transmission ratio $\Theta/x_1$ of the output hub 202. Further, the second linear actuator 206 may be configured to move the second end of the tension-bearing element 208 to a position closer to the output hub 202 so as to decrease the transmission ratio $\Theta/x_1$ of the output hub 202. As such, the second actuator 206 may be a configuration actuator, in that the second linear actuator 206 configures the transmission ratio $\Theta/x_1$ of the variable transmission system 200, and then may remain stationary as the first linear actuator 204 drives the output hub 202. In another embodiment, the second linear actuator 206 may be the driving actuator, while the first linear actuator 204 may be the configuration actuator. In yet another embodiment, both the first linear actuator 204 and the second linear actuator 206 may be driving actuators used to drive rotation of the output hub 202.

As described above, the transmission ratio $\Theta/x_1$ of the variable transmission system 200 may be adjusted based on the position of the second linear actuator 206 relative to the output hub 202. The second linear actuator 206 may be used to adjust the ratio of the length of first segment ($L_1$) of the tension-bearing element 208 to the length of a second segment ($L_2$) of the tension bearing element 208. The resulting ratio $L_1/L_2$ is inversely proportional to the transmission ratio $\Theta/x_1$ of the variable transmission system 200.

Each linear actuator in the variable transmission system 200 may have a maximum defined range of motion in the x-direction. In one example, the maximum range of motion of the first linear actuator 204 is greater than the maximum range of motion of the second linear actuator 206. Such a configuration may enable the first linear actuator 204 to cause the output hub 202 to have a large angle of rotation $\Theta$. Other configurations are possible as well.

In one embodiment, the variable transmission system 200 may include a force sensor coupled to the output hub 202. The variable transmission system 200 may further include a processor configured to receive outputs from the force sensor (e.g., which may be a capacitive sensor, a tension sensor, etc.) to control an input to the first linear actuator 204. In another example, the processor may be configured to receive outputs from the force sensor to control an input to the second linear actuator 206. In yet another example, the processor may be configured to receive outputs from the force sensor to control inputs to both the first linear actuator 204 and the second linear actuator 206.

In another example, the tension-bearing element 208 may include multiple sections of different materials, each with different stiffness profiles. Each of the multiple sections may be separated by nodes. In such a configuration, the transmission ratio $\Theta/x_1$ of the output hub 202 may be set based on coupling the second linear actuator 206 to a given node of the tension-bearing element 208.

Figure 3:
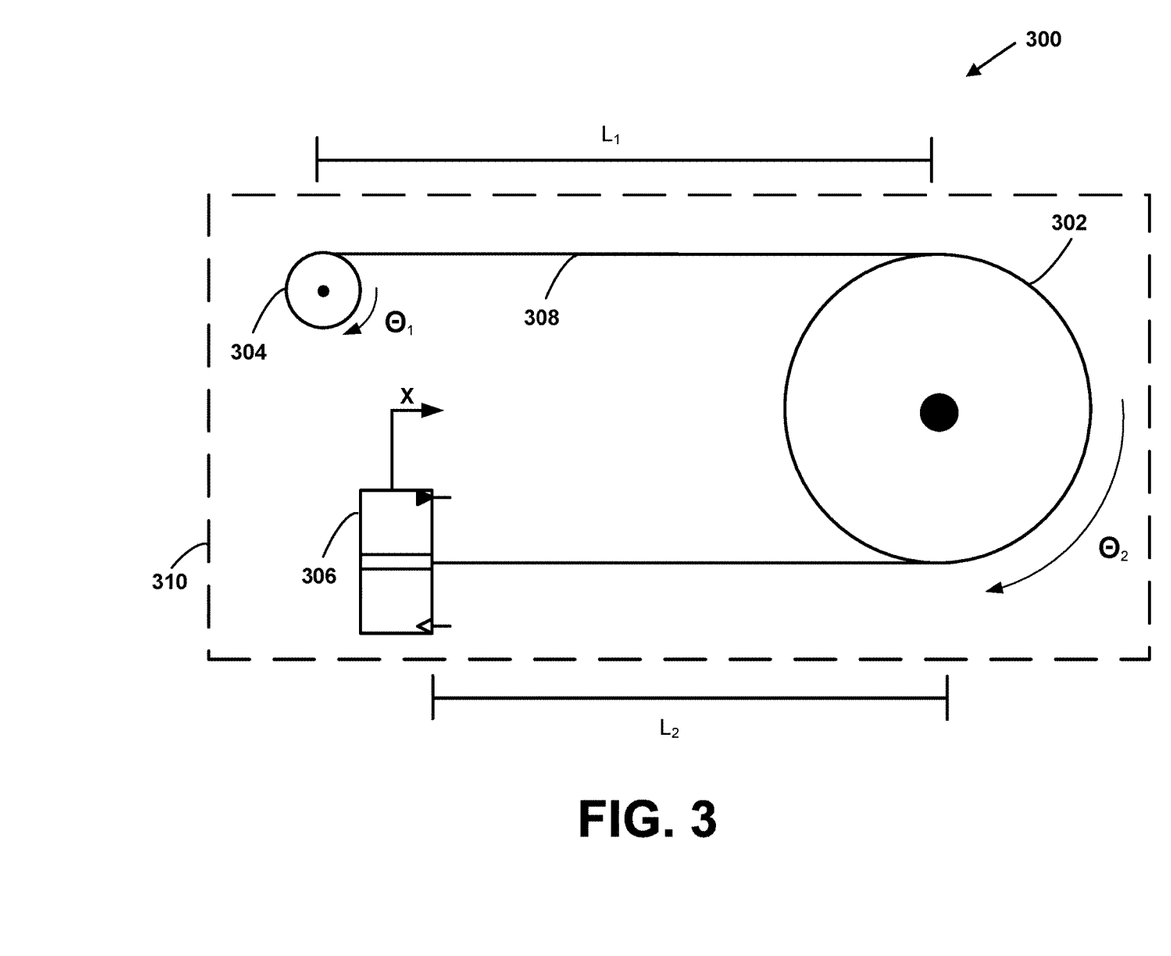
FIG. 3 illustrates yet another simplified diagram of a variable transmission system, according to an example embodiment.

FIG. 3 illustrates yet another simplified diagram of a variable transmission system, according to an example embodiment. The variable transmission system 300 may include an output hub 302, an input hub 304 and a linear actuator 306. The variable transmission system 300 may further include a tension-bearing element 308 positioned around the output hub 302. A first end of the tension-bearing element 308 is positioned around the input hub 304, and a second end of the tension-bearing element 308 is coupled to the linear actuator 306. In one example, the variable transmission system 300 may include a frame 310. In such an embodiment, the output hub 302, the input hub 304, and the linear actuator 306 may be coupled to the frame 310. In particular, the output hub 302 and input hub 304 may be rotatably coupled to the frame 310 so as to allow rotation of the output hub 302 and input hub 304 relative to the frame 310. The output hub 302 and input hub 304 may be coupled to the frame 210 via a pin, or some other means to allow free rotation. The frame 310 may be any type of housing and may be configured as an endoskeleton structure in which the output hub 302 is mounted on an exterior of the frame 310, or as an exoskeleton in which the output hub 302 is mounted within a clamshell type structure.

The tension-bearing element 308 may be compliant and stretch under load, as discussed above in relation to FIG. 2. For example, the tension-bearing element 208 may comprise an elastic material, such as natural or synthetic rubber, or other elastomer materials. As such, the tension-bearing element 308 may include a variable stiffness profile. The linear actuator 306 may be electro-mechanical actuators, including an electric motor configured to convert a rotary motion of the electric motor to a linear displacement of the linear actuator relative to the output hub 302. The linear displacement may be in the x-direction shown in FIG. 3. Other potential linear actuators are possible as well, such as hydraulic actuators, pneumatic actuators, piezoelectric actuators, linear motors, or telescoping linear actuators, as discussed above.

The input hub 304 may be coupled to a motor. The motor may include a pinion gear coupled to the input hub 304, such that a rotation of the motor causes a rotation of the input hub 304. As the input hub 304 rotates, the tension-bearing element 208 is configured to spool around the input hub 304, thereby causing the output hub 302 to rotate. A motor encoder may be coupled to the motor to determine a position of the motor and enable a control loop to control the position of the linear actuator 306 relative to the output hub 302.

The linear actuator 306 may be configured to move the second end of the tension-bearing element 308 to a position further away from the output hub 302 so as to stretch the complaint tension-bearing element 308, thereby increasing the transmission ratio $\Theta_2/\Theta_1$ of the output hub 302. Further, the linear actuator 306 may be configured to move the second end of the tension-bearing element 308 to a position closer to the output hub 302 so as to decrease the transmission ratio $\Theta_2/\Theta_1$ of the output hub 302. As such, the linear actuator 306 may be a configuration actuator, in that the linear actuator 306 configures the transmission ratio $\Theta_2/\Theta_1$ of the variable transmission system 300, and then may remain stationary as the input hub 304 drives the rotation of the output hub 302.

As described above, the transmission ratio $\Theta_2/\Theta_1$ of the variable transmission system 300 may be adjusted based on the position of the linear actuator 306 relative to the output hub 302. The linear actuator 306 may be used to adjust the ratio of the length of first segment ($L_1$) of the tension-bearing element 208 (which is constant in the configuration shown in FIG. 3) to the length of a second segment ($L_2$) of the tension bearing element 208. The resulting ratio $L_1/L_2$ is inversely proportional to the transmission ratio $\Theta_2/\Theta_1$ of the variable transmission system 300.

In one embodiment, the variable transmission system 300 may include a force sensor coupled to the output hub 302. The variable transmission system 300 may further include a processor configured to receive outputs from the force sensor (e.g., which may be a capacitive sensor, a tension sensor, etc.) to control an input to the motor coupled to the input hub 304. In another example, the processor may be configured to receive outputs from the force sensor to control an input to the linear actuator 306. In yet another example, the processor may be configured to receive outputs from the force sensor to control inputs to both the motor and the linear actuator 306.

In another embodiment, the input hub 304 may be configured to adjust the transmission ratio $\Theta_2/\Theta_1$ of the variable transmission system 300, and the linear actuator 306 may be configured to drive the rotation of the output hub 302. Other configurations are possible as well.

The variable transmission systems described above in relation to FIG. 2 and FIG. 3 may be used in a variety of applications. In one example, the output hub may be coupled to a joint of a robotic system. For example, the variable transmission system may increase the transmission ratio if the robotic joint picks up a heavy object. The increased transmission ratio gives the robotic system a mechanical advantage that eases the stress of holding the heavy object for a period of time. The variable transmission systems may also be used in variable-gain sensors, variable resolution read heads, among other applications.

Figure 4A:
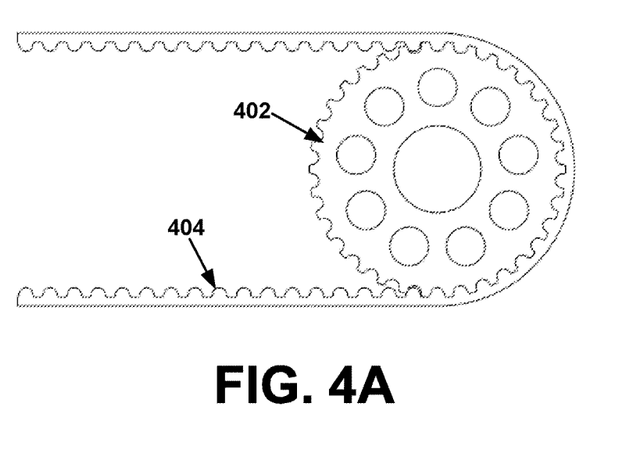
FIG. 4A illustrates a top view of the example output hub and tension-bearing element.
Figure 4B:
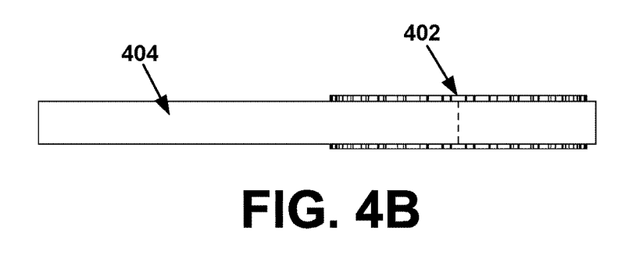
Figure 4C:
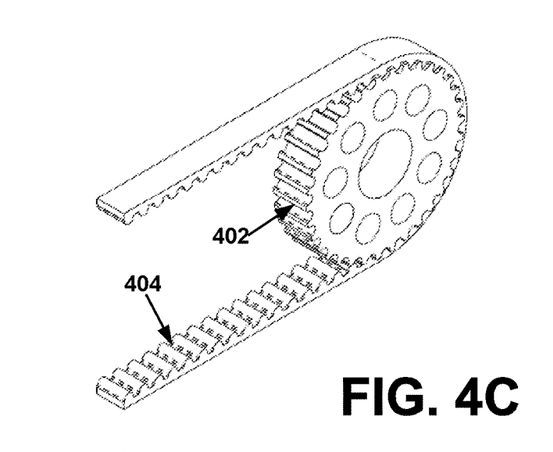
Figure 4D:
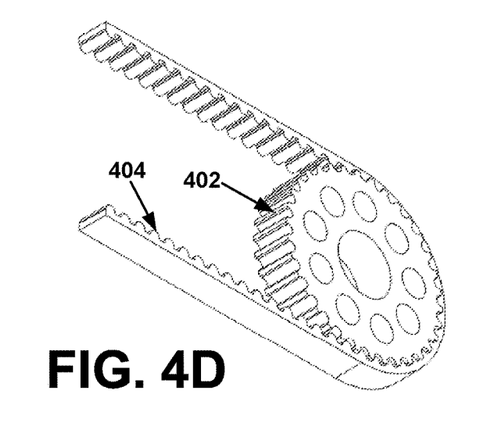

FIGS. 4A-4D illustrate an example output hub 402 and tension-bearing element 404. FIG. 4A illustrates a top view of the example output hub 402 and tension-bearing element 404, FIG. 4B illustrates a side view of the example output hub 402 and tension-bearing element 404, FIG. 3C illustrates a top perspective view of the example output hub 402 and tension-bearing element 404, and FIG. 3D illustrates a bottom perspective view of the example output hub 402 and tension-bearing element 404.

In FIGS. 4A-4D the output hub 402 includes teeth, and the tension-bearing element 404 is a toothed belt that interlocks to the teeth of the output hub 402. The tension-bearing element 404 may be connected in series with a spring or other compliant material. The output hub 402 may be any of the output hubs in FIGS. 1-3, and the tension-bearing element 304 may be any of the tension-bearing elements in FIGS. 1-3, for example.

The tension-bearing element 404 has a specific tooth profile and enables accurate positioning on the output hub 402 along with an ability to efficiently transfer high loads, for example. For example, the tooth profile of the tension-bearing element 404 matches the tooth profile of the output hub 402 to match together for zero backlash. Other configurations of the output hub and tension-bearing element are possible as well.

Figure 5:
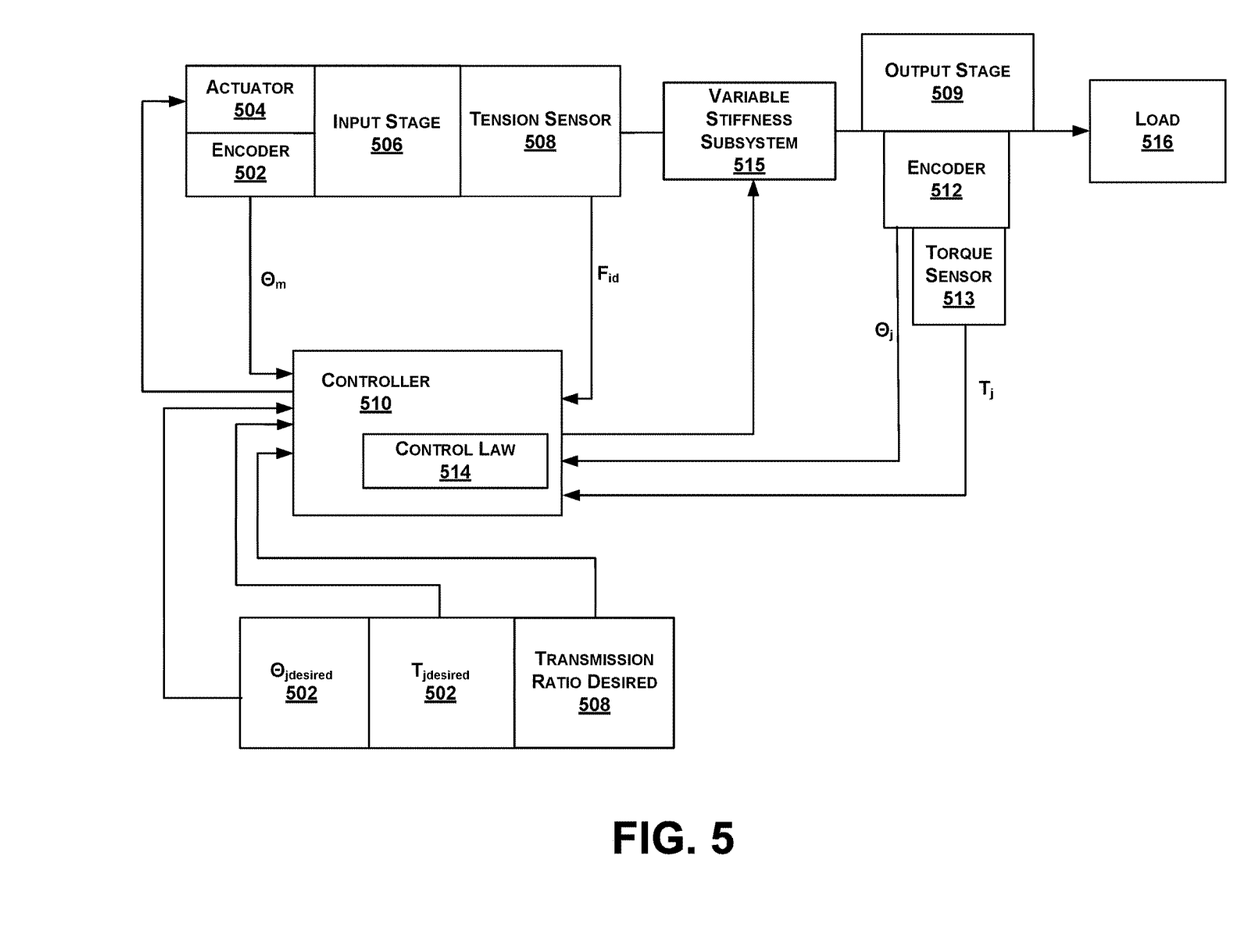
FIG. 5 is a block diagram illustrating an example system for control of a variable transmission system.

FIG. 5 is a block diagram illustrating an example system for control of a variable transmission system. As shown in FIG. 5, an encoder 502 may couple to an actuator 504 that drives an input stage 506 of the variable transmission system. The encoder 502 may sense an input angle, $\Theta_m$. In addition, a tension sensor 508 may determine a belt tension sensor measurement, $F_{id}$, and outputs the belt tension sensor measurement to a controller 510. Another encoder 512 may couple to an output stage 509 of the variable transmission system to sense a joint angle, $\eta_j$, or load position. Further, the encoder 512 may couple to a torque sensor 513 to sense a torque $T_j$, that is applied to a load 516. The encoders 502 and 512 may be optical encoders, Hall effect sensors, or other capacitive angle sensors, for example. In one example, the input stage 506 is configured to transfer linear motion to rotary motion of the output stage 509, such as the configuration described above in relation to FIG. 2. In another configuration, the belt may be positioned around the input stage 506 and the output stage 509, such that a rotation of the input stage 506 translates to a rotation of the output stage 509, such as the configuration described above in relation to FIG. 3. Other example configurations are possible as well.

In addition, a variable stiffness subsystem 515 may be positioned between the input stage 506 and the output stage 509. The variable stiffness subsystem 515 may include an adjustable stiffness pneumatic spring, a material with stiffness that is adjustable via electrical current or magnetic field, or a spring that is mechanically reconfigurable to vary stiffness via the actuator 504. Other configurations are possible as well.

The controller 510 may further receive input commands, such as the desired joint angle, $O_{jdesired}$, the desired torque, $T_{jdesired}$, and the desired transmission ratio. The controller 510 may use the received input commands to controller the actuator 504 and variable stiffness subsystem 515 to produce the cause the variable transmission system to execute the desired commands.

The control law module 514 may transform state variables into command current to motor. A full state control or measure of a full state of the system (e.g., motor position with encoder, motor velocity, motor acceleration, joint position with encoder, output torque with load cells) can be utilized as a linear combination to calculate the command current. A servo-loop is created around tensor sensor values for torque applied at a joint. The control law module 514 may operate as a known proportional integral derivative (PID) module, for example. A PID controller may include a control loop feedback mechanism that calculates an error value as a difference between a measured process variable and a desired set point. The PID controller attempts to minimize the error by adjusting process control outputs. The PID controller algorithm may involve three separate constant parameters, including the proportional, the integral, and the derivative values, denoted P, I, and D. These values can be interpreted in terms of time: P depends on the present error, I on accumulation of past errors, and D is a prediction of future errors, based on current rate of change. A weighted sum of these three actions is used to adjust a process via a control element such as the output torque to be applied.

The control law module 514, or other components of the design in FIG. 5, may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

The control law module 514 may also be a computing device (or components of a computing device such as one or more processors), that may execute instructions to perform functions as described herein.

Within examples, the belt transmission may be compliant and stretch under load, causing a displacement in output position from an expected position. Use of an output encoder 512 enables measurement of the actual output position independent of the load 516. A model of belt stretch may be employed in addition to, or instead of, the joint encoder. The belt stretch model can take as an input the applied tension in the belt, physical parameters of the belt such as modulus of elasticity, and environmental parameters such as temperature of the belt. The belt stretch model may output an amount of elastic stretch in the belt such that commanded motor position can be adjusted and a desired output position achieved. The model may be as simple as a linear spring, or may include non-linear effects such as hysteresis. Alternatively, the belt stretch can be measured empirically across a range of working loads and a look-up table used to compute the motor position offset.

Figure 6:
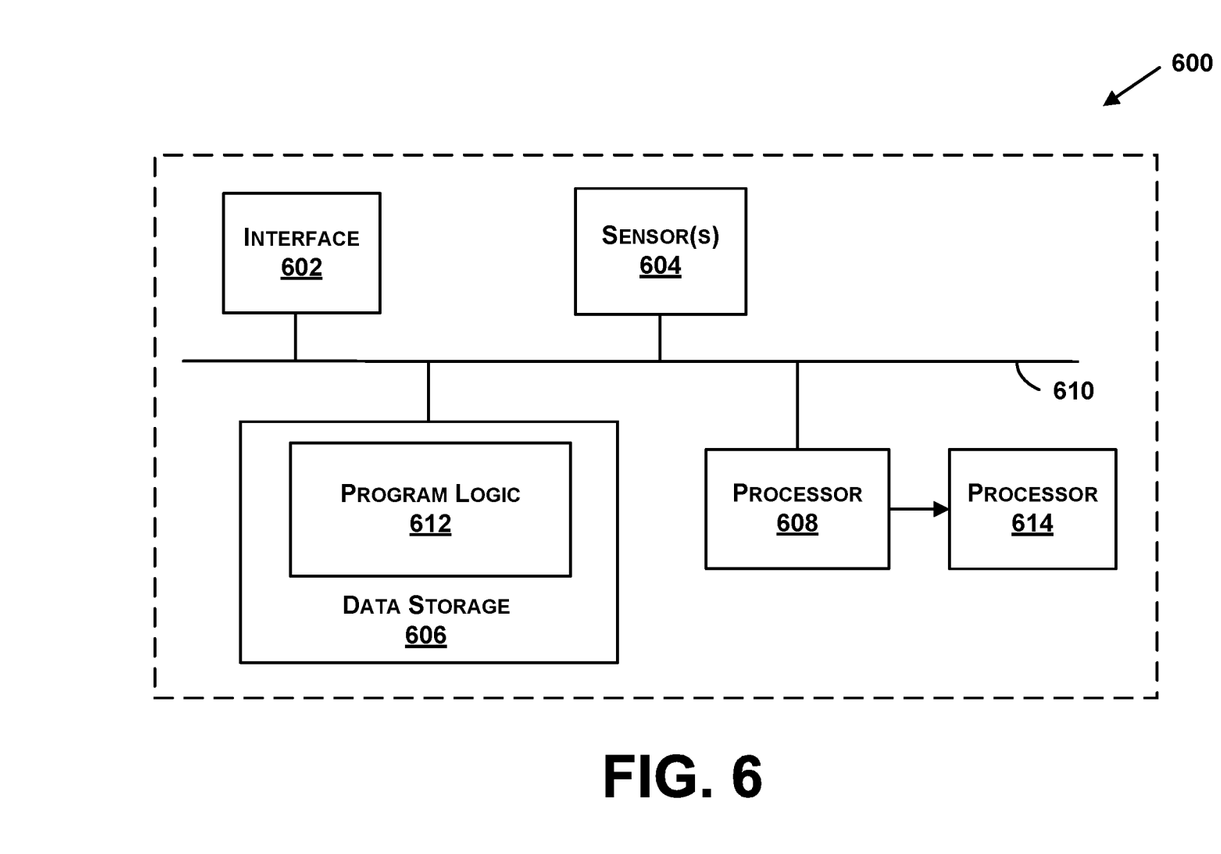
FIG. 6 illustrates a schematic drawing of an example computing device.

FIG. 6 illustrates a schematic drawing of an example computing device 600. In some examples, some components illustrated in FIG. 6 may be distributed across multiple computing devices. However, for the sake of example, the components are shown and described as part of one example device 600. The device 600 may be or include a mobile device, desktop computer, tablet computer, or similar device that may be configured to perform the functions described herein. Within examples, components, or combinations of components, of the system shown in FIG. 5 may take the form of a computing device, like the computing device 600 shown in FIG. 6.

The device 600 may include an interface 602, sensor(s) 604, data storage 606, and a processor 608. Components illustrated in FIG. 6 may be linked together by a communication link 610. The communication link 610 is illustrated as a wired connection; however, wireless connections may also be used. The device 600 may also include hardware to enable communication within the device 600 and between the client device 600 and another computing device (not shown), such as a server entity. The hardware may include transmitters, receivers, and antennas, for example.

The interface 602 may be configured to allow the device 600 to communicate with another computing device (not shown), such as a server. Thus, the interface 602 may be configured to receive input data from one or more computing devices, and may also be configured to send output data to the one or more computing devices. The interface 602 may also be configured to receive input from and provide output to a torque controlled actuator or modular link of a robot arm, for example. The interface 602 may include a receiver and transmitter to receive and send data. In other examples, the interface 602 may also include a user-interface, such as a keyboard, microphone, touchscreen, etc., to receive inputs as well.

The sensor 604 may include one or more sensors, or may represent one or more sensors included within the device 600. Example sensors include an accelerometer, gyroscope, pedometer, light sensors, microphone, camera, or other location and/or context-aware sensors that may collect data of the variable transmission system (e.g., motion of input hub or output hub) and provide the data to the data storage 606 or processor 608.

The processor 608 may be configured to receive data from the interface 602, sensor 604, and data storage 606. The data storage 606 may store program logic 612 that can be accessed and executed by the processor 608 to perform functions executable to determine instructions for operation of the variable transmission system. Example functions include determination of motor current based on sensed tension in the tension-bearing elements, output torque, and optionally angular displacements of the output hub based on a control loop or other feedback mechanism to determine desired output torques. Any functions described herein, or other example functions for the variable transmission system may be performed by the device 600 or one or more processors 608 of the device via execution of instructions stored on the data storage 606 or otherwise received.

The device 600 is illustrated to include an additional processor 614. The processor 614 may be configured to control other aspects of the device 600 including displays or outputs of the device 600 (e.g., the processor 614 may be a GPU). Example methods described herein may be performed individually by components of the device 600, or in combination by one or all of the components of the device 600. In one instance, portions of the device 600 may process data and provide an output internally in the device 600 to the processor 614, for example. In other instances, portions of the device 600 may process data and provide outputs externally to other computing devices.

Within some examples herein, operations may be described as methods for performing functions, and methods may be embodied on a computer program product (e.g., a tangible computer readable storage medium or non-transitory computer readable medium) that includes instructions executable to perform the functions.

Figure 7:
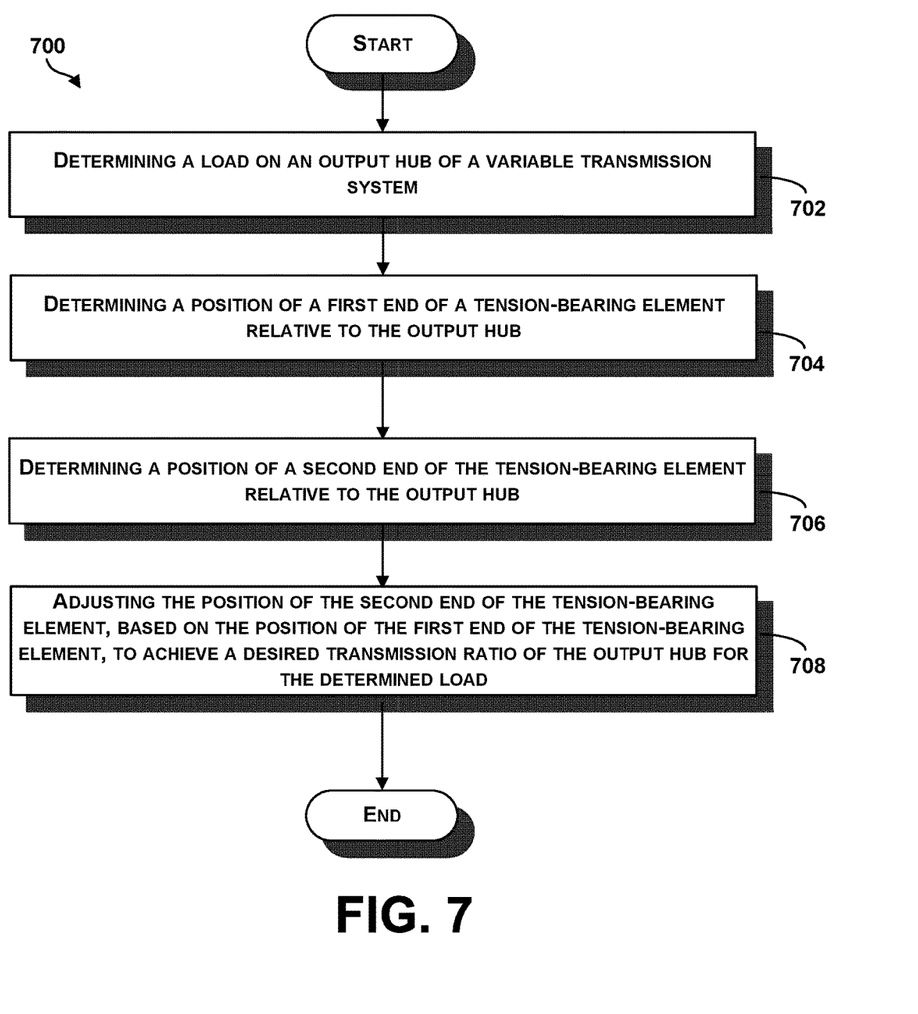
FIG. 7 is a flowchart illustrating an example method for operating a variable transmission system.

FIG. 7 is a flowchart illustrating an example method 700 for operating a variable transmission system. Method 700 may include one or more operations, functions, or actions as illustrated by one or more of blocks 702-708. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Referring again to FIG. 7, at block 702, the method 700 includes determining a load on an output hub of a variable transmission system. The load may be determined via a sensor coupled to the output hub, such as a strain gauge or a load cell as an example.

At block 704, the method 700 includes determining a position of a first end of a tension-bearing element relative to the output hub. The tension-bearing element may be compliant and stretch under load, as discussed above in relation to FIGS. 2 and 3. Further, the tension-bearing element may be positioned around the output hub, as described above in relation to FIGS. 1-3. The position of the first end of the tension-bearing element may be determined by various sensors of the variable transmission system, such as position sensor as an example. In another example, a first linear actuator may be coupled to the first end of the tension-bearing element. The first linear actuator may be configured to move the first end of the tension-bearing element to a position further away from the output hub so as to rotate the output hub in a first direction. Further, the first linear actuator may be configured to move the first end of the tension-bearing element to a position closer to the output hub so as to rotate the output hub in a second direction. In such an embodiment, the variable transmission system may determine the position of the first end of the tension-bearing element based on the position of the first actuator.

At block 706, the method 700 includes determining a position of a second end of the tension-bearing element relative to the output hub. The position of the second end of the tension-bearing element may be determined by various sensors of the variable transmission system, such as position sensor as an example. In another example, a second linear actuator may be coupled to the second end of the tension-bearing element. In such an embodiment, the variable transmission system may determine the position of the second end of the tension-bearing element based on the position of the second actuator.

At block 708, the method 700 includes adjusting the position of the second end of the tension-bearing element, based on the position of the first end of the tension-bearing element, to achieve a desired transmission ratio of the output hub for the determined load. In one example, the second end of the tension-bearing element may be coupled to a linear actuator, as discussed above. The variable transmission system may have a processor configured to receive data from the various elements of the transmission system, including the load on the output hub, the initial position of the first end of the tension-bearing element, and the initial position of the second end of the tension-bearing element. The processor may calculate an initial transmission ratio based on the initial positions of the first and second ends of the tension-bearing element. The processor may also store a table including desired transmission ratios for various ranges of load applied to the output hub. The processor may then compare the determined load with the table of desired transmission ratios, and subsequently instruct the variable transmission system to position the second end of the tension-bearing element such that the variable transmission system has the desired transmission ratio. Other embodiments are possible as well.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A variable transmission system comprising:
a tension-bearing element positioned around an output hub, wherein a first end of the tension-bearing element is coupled to a first linear actuator, wherein a second end of the tension-bearing element is coupled to a second linear actuator, and wherein the tension-bearing element includes a variable stiffness profile such that a transmission ratio of the output hub may be adjusted based on a position of the second linear actuator relative to the output hub.

2. The variable transmission system of claim 1, wherein the first linear actuator is configured to move the first end of the tension-bearing element to a position further away from the output hub so as to rotate the output hub in a first direction, and wherein the first linear actuator is also configured to move the first end of the tension-bearing element to a position closer to the output hub so as to rotate the output hub in a second direction.

3. The variable transmission system of claim 1, wherein the second linear actuator is configured to move the second end of the tension-bearing element to a position further away from the output hub so as to increase the transmission ratio of the output hub, and wherein the second linear actuator is also configured to move the second end of the tension-bearing element to a position closer to the output hub so as to decrease the transmission ratio of the output hub.

4. The variable transmission system of claim 1, wherein the first linear actuator includes an electro-mechanical actuator, wherein the electro-mechanical actuator includes an electric motor configured to convert a rotary motion of the electric motor to a linear displacement of the first linear actuator relative to the output hub.

5. The variable transmission system of claim 1, wherein the second linear actuator includes an electro-mechanical actuator, wherein the electro-mechanical actuator includes an electric motor configured to convert a rotary motion of the electric motor to a linear displacement of the second linear actuator relative to the output hub.

6. The variable transmission system of claim 1, further comprising:
a force sensor coupled to the output hub; and
a processor to control an input to the first linear actuator based on an output from the force sensor.

7. The variable transmission system of claim 1, wherein the output hub includes teeth, and wherein the tension-bearing element comprises a toothed belt that interlocks to the teeth of the output hub.

8. The variable transmission system of claim 1, wherein a range of motion of the first linear actuator is greater than a range of motion of the second linear acutator.

9. The variable transmission system of claim 1, wherein the tension-bearing element comprises an elastic member.

10. The variable transmission system of claim 1, wherein the tension-bearing element comprises multiple sections that have varying stiffness, and wherein the multiple sections are coupled via nodes.

11. The variable transmission system of claim 10, wherein the transmission ratio of the output hub is set based on coupling the second linear actuator to a given node of the tension-bearing element.

12. A variable transmission system, comprising:
an output hub;
an input hub;
a linear actuator; and
a tension-bearing element positioned around the output hub, wherein a first end of the tension-bearing element is positioned around the input hub, wherein a second end of the tension-bearing element is coupled to the linear actuator, and wherein the tension-bearing element includes a variable stiffness profile such that a transmission ratio of the output hub may be adjusted based on a position of the linear actuator relative to the output hub.

13. The variable transmission system of claim 12, wherein the linear actuator is configured to move the second end of the tension-bearing element to a position further away from the output hub so as to increase the transmission ratio of the output hub, and wherein the linear actuator is also configured to move the second end of the tension-bearing element to a position closer to the output hub so as to decrease the transmission ratio of the output hub.

14. The variable transmission system of claim 12, further comprising a motor coupled to the input hub, wherein the motor is configured to spool the tension-bearing element around the input hub.

15. The variable transmission system of claim 14, further comprising a motor encoder coupled to the motor to determine a position of the motor and enable a control loop to control the position of the linear actuator relative to the output hub.

16. The variable transmission system of claim 14, further comprising:
a force sensor coupled to the output hub; and
a processor to control an input to the motor based on an output from the force sensor.

17. The variable transmission system of claim 14, wherein the motor includes a pinion gear coupled to the input hub for causing a rotation of the input hub.

18. A method comprising:
determining a load on an output hub of a variable transmission system;
determining a position of a first end of a tension-bearing element relative to the output hub, wherein the first end of the tension-bearing element is positioned around an input hub;
determining a position of a second end of the tension-bearing element relative to the output hub, wherein the second end of the tension-bearing element is coupled to a linear actuator; and
adjusting the position of the first end of the tension-bearing element and/or adjusting the position of the second end of the tension-bearing element to achieve a desired transmission ratio of the output hub for the determined load.

19. The method of claim 18, wherein the linear actuator is configured to move the second end of the tension-bearing element to a position further away from the output hub so as to increase the transmission ratio of the output hub, and wherein the linear actuator is also configured to move the second end of the tension-bearing element to a position closer to the output hub so as to decrease the transmission ratio of the output hub.

20. The method of claim 19, further comprising a motor coupled to the input hub, wherein the motor is configured to spool the tension-bearing element around the input hub to thereby adjust the transmission ratio of the output hub.

* * * * *